Figure 1:
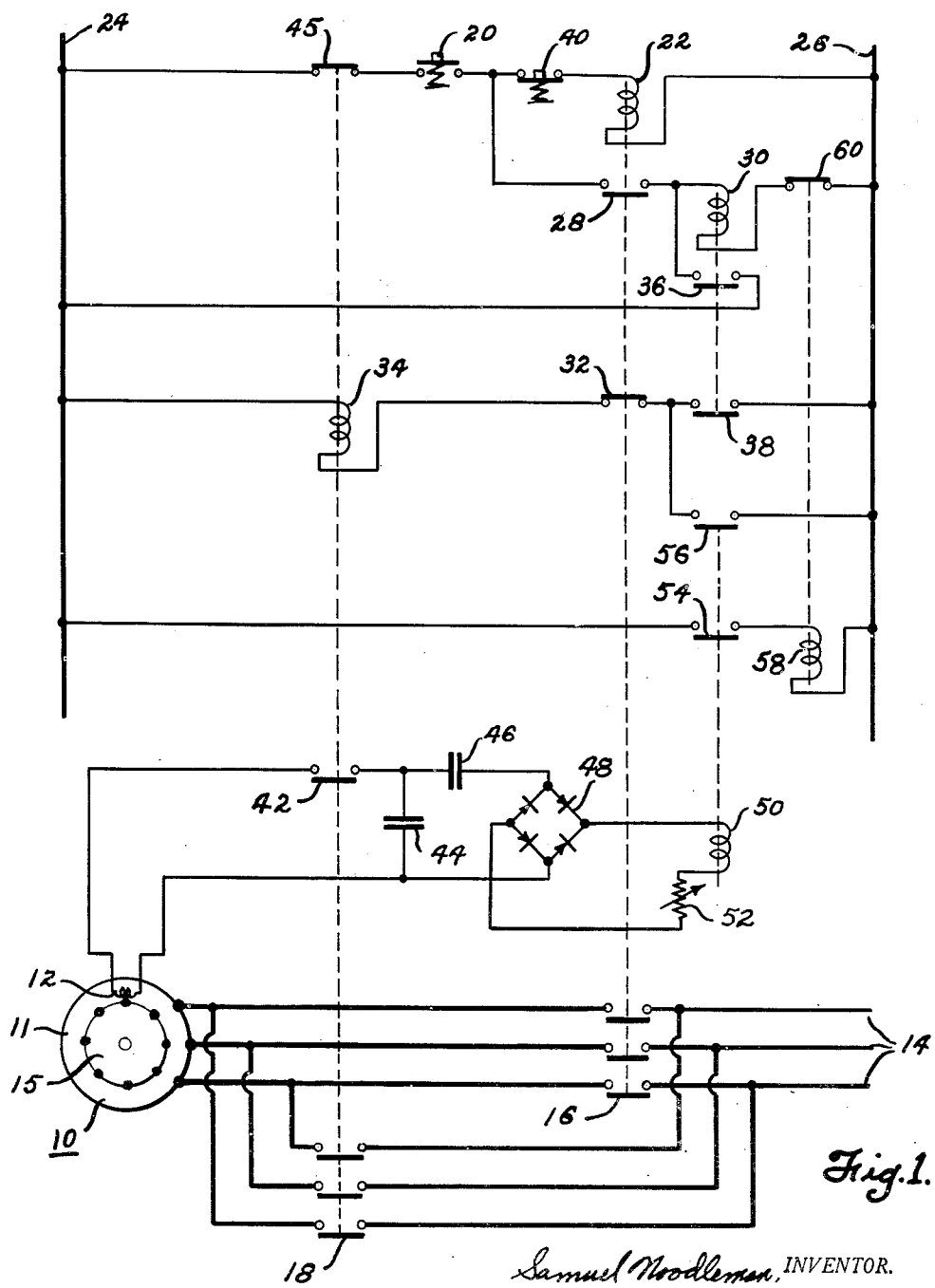

March 18, 1952     S. NOODLEMAN     2,589,276
MOTOR CONTROL SYSTEM

Filed May 5, 1948     2 SHEETS—SHEET 1

Samuel Noodleman, INVENTOR.
BY Dybvig & Dybvig
His Attorneys

Patented Mar. 18, 1952

2,589,276

UNITED STATES PATENT OFFICE 2,589,276

MOTOR CONTROL SYSTEM

Samuel Noodleman, Dayton, Ohio, assignor to Louis R. Mahrt and D. Robert Laughter, as trustees for Standard Dayton Corporation, Dayton, Ohio, a corporation of Ohio Application May 5, 1948, Serial No. 25,181

18 Claims. (Cl. 318—210)

This invention relates to an electric motor control and more particularly to an improved arrangement for quickly stopping a motor.

There are many motor installations wherein a motor is used for intermittently driving a given piece of machinery which must be started and stopped at frequent intervals and in which the time required for stopping the motor and the machine driven thereby should be kept at a minimum for the sake of efficiency. Thus, in some factory operations the motor is required to operate for only a short period of time to complete a given operation, and if too much time is required for allowing the machinery to come to a standstill after each operation, valuable time is lost and the labor cost for the operation becomes excessive. Furthermore, there are many factory operations where machines are used which must be stopped almost instantly for reasons other than for time saving, and unless some means is provided for overcoming the momentum of the moving parts of the machine, the machine will coast along for some time under its own momentum. Various arrangements have been devised for quickly stopping a motor at the completion of a given operation and these have operated with varying degrees of success. Some have been impractical in that they have not been able to stand up over a long period of time, others have been impractical due to the need for delicate adjustments from time to time, and still others have proven unsatisfactory due to the excessive wear on the equipment or for other reasons.

It is an object of this invention to provide an inexpensive, trouble-free motor control which is smooth and rapid in operation.

More particularly, it is an object of this invention to provide a motor control arrangement for a polyphase motor wherein a braking effect is produced by reconnecting the phase windings of the motor so as to reverse the torque during the initial braking period and to subsequently automatically disconnect the current as the motor approaches zero speed so as to prevent operating the motor in the reverse direction of operation.

A further object of this invention is to provide a motor control circuit arrangement which does not decrease the efficiency of the motor and which operates equally well in either direction of rotation of the motor.

Still another object of this invention is to provide a motor control arrangement which is compact and which does not necessitate increasing the size of the motor.

Still another object of this invention is to provide a motor control system using conventional relays and switches of proven durability.

Still another object of this invention is to provide an electrically operated speed responsive control of general application and one which is not sensitive to voltage changes, temperature changes, et cetera.

More particularly, it is an object of this invention to provide a control comprising a pick-up coil disposed within the motor and means connected thereto operated in response to a predetermined change in the frequency of the voltage generated in said pick-up coil.

I have found that in standard motors there is generated a voltage having a principal wave form corresponding to the 60 cycle energizing voltage and having a superimposed wave form of a much higher frequency caused by the relative rotation between the stator and the rotor. The high frequency waves are on the order of harmonics which gradually decrease in frequency as the motor decreases its speed. The high frequency waves may be detected by the use of a special pick-up coil or they may be detected by connections from one feed line to the neutral of the motor, in which case the one phase winding of the motor serves as the pick-up coil. It is an object of this invention to provide a control system in which the voltage generated by virtue of the presence of these harmonics is used for operating a control such as a reversing switch.

Another object of this invention is to provide a control system comprising a pick-up coil, a resonating condenser and a blocking condenser in combination with a control circuit which is adapted to be energized at certain frequencies.

Other objects and advantages reside in the construction of parts, the combination thereof and the mode of operation, as will become more apparent from the following description.

Figure 1 of the drawings shows a schematic wiring diagram of a preferred embodiment of my invention.

Figure 2:
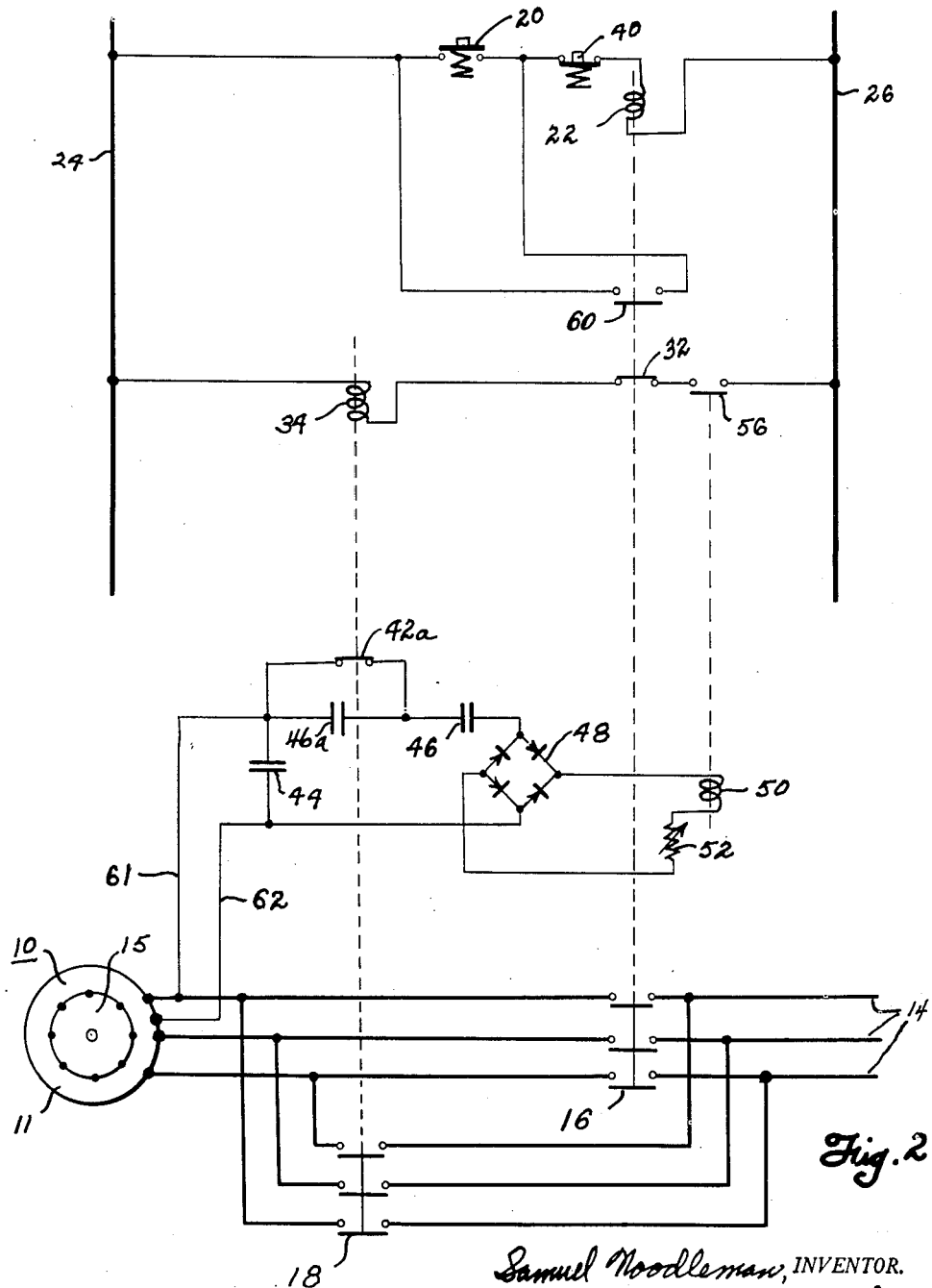

Figure 2 of the drawings shows an alternative wiring diagram of a simplified system embodying features of my invention.

For purposes of illustrating my invention, I have shown the control used in combination with a motor starting and stopping circuit, whereas certain aspects of my invention are equally applicable to other types of controls.

Referring now to the drawings, reference numeral 10 designates a conventional polyphase motor having a stator 11 and a squirrel cage rotor 15 and having incorporated in the stator a coil 12 which is preferably mounted in the conventional field winding slots of the stator, so as to have generated therein an induced voltage for a purpose to be explained more fully hereinafter. Reference numeral 14 designates the main power lines from which current is supplied to the motor 10 through the main switch 16 which is adapted to be closed whenever it is desired to operate the motor 10 in its forward or normal running direction.

Reference numeral 18 designates a reversing switch which is adapted to be momentarily closed immediately after the running switch 16 has been opened, so as to reverse the phase windings of the motor for the purpose of producing a braking effect on the motor. The switch 18 is adapted to be closed only long enough to reduce the motor speed approximately to zero, at which time the switch 18 is opened by the control system as explained hereinafter.

The main motor control circuit comprises a "start" button or switch 20 and a "stop" button or switch 40. The starting switch 20 is connected in circuit with the "running" solenoid 22 which when energized closes the main motor switch 16. The solenoid 22 is connected in circuit with the switches 20 and 40 between the power lines 24 and 26 as shown. Immediately upon closing the starting switch 20, the relay 22 will be energized and will close the switch 28 which is arranged in series with the conventional transfer solenoid 30 and will also open the switch 32 which is arranged in series with the reversing solenoid 34, so as to prevent closing of the reversing switch 18 at all times when the main switch 16 is closed.

In order to start the motor 10, it is first necessary to press the start button 20, so as to energize the solenoid 22. Upon energization of the solenoid 22, the switches 16 and 28 are closed and the switch 32 is opened. Closing of the switch 28 energizes the solenoid 30, which in turn closes the switches 36 and 38. Closing of the switch 36 results in maintaining the solenoid 22 energized even after the start button 20 is no longer held in a closed position.

In order to stop the motor 10, one presses the stop button 40 which causes deenergization of the running solenoid 22, with the result that the switches 28 and 16 open and the switch 32 closes. It will be noted that opening of the switch 28 does not deenergize solenoid 30, since it remains energized through the line in which the switch 36 is located. It will also be noted that as long as the solenoid 30 is energized, the switch 38 remains closed. Consequently, deenergization of the solenoid 22 in response to operation of the stop button 40 energizes the reversing solenoid 34 through the closing of switch 32. Energization of the solenoid 34 closes the reversing switch 18, closes the switch 42, and opens the switch 45. The switch 45 is arranged in series with the starting switch 20, whereby it is impossible to reenergize the solenoid 22 as long as the reversing solenoid 34 is energized.

In order to provide a practical arrangement for causing reopening of the reversing switch 18 as the motor 10 approaches a standstill and before the motor actually reverses its direction of rotation, I have provided a pick-up coil 12 which is preferably disposed within the motor stator at any convenient location, so as to have generated therein a signal having a principal wave form corresponding to the 60 cycle energizing voltage and a secondary or superimposed high frequency wave or ripple generated as a result of the relative rotation between the squirrel cage rotor and the stator of the motor. This high frequency ripple is then amplified and the 60 cycle wave is blocked out. To do this, the pick-up coil 12 is arranged in a circuit comprising a resonating condenser 44 which is connected across the pick-up coil 12 and a rectifier 48 arranged as shown. A blocking condenser 46 is provided for blocking out the 60 cycle signals which result from the main field excitation. The rectifier 48 is connected in the circuit for rectifying the current resulting from the high frequency signal pick-up by the coil 12. The output of the rectifier 48 is connected to a control means in the form of a solenoid 50 through an adjustable resistance 52. The resistance 52 provides a means for adjusting the speed of the motor at which the solenoid 50 opens the switches 54 and 56 and consequently switch 18.

By virtue of the above described arrangement, it is apparent that when the reversing solenoid 34 is energized so as to reverse the phase connections to the motor, the control switch 42 will be closed, with the result that the control solenoid 50 will be energized so long as the high frequency ripple is being generated. Energization of the control solenoid 50 closes the switches 54 and 56. Closing of the switch 54 energizes the solenoid 58, which in turn opens the switch 60 so as to drop out the switches 36 and 38, thereby placing the reversing solenoid 34 under complete control of the switch 56.

As the speed of the motor 10 decreases, the pick-up coil 12 will continue to pick up the 60 cycle signal resulting from the energization of the field windings of the motor, but the higher frequency signals or ripples resulting from the relative rotation of the motor and the stator will die out, so as to gradually decrease the current available for energizing the control solenoid 50. Just before the motor comes to a standstill, the high frequency signal will die out completely and the switches 54 and 56 will automatically open due to the lack of any energizing current for the solenoid 50. Opening of the switch 56 deenergizes the reversing solenoid 34, so as to drop out the switch 18 and thereby cause the motor to be deenergized at or substantially at zero speed. Opening the switch 54 deenergizes the solenoid 58 so as to close the switch 60 and thereby prepare the system for restarting the motor in its forward direction upon closing the start button 20.

In Figure 2 of the drawings, I have shown a simplified circuit arrangement in which the principle of operation is essentially the same as in the above described circuit but in which the need for a pick-up coil and two of the relays has been eliminated. Thus the solenoids 30 and 58 shown in Figure 1 of the drawings have been eliminated in the circuit shown in Figure 2 of the drawings. The pick-up coil can be eliminated, since high frequency waves are generated in the main phase winding as a result of relative rotation between the squirrel cage motor rotor and the motor stator and these waves can be used in operating the solenoid 50. In order to simplify this disclosure, the same reference numerals have been used to designate corresponding parts in both circuit arrangements and, unless otherwise indicated, like numbered parts are similar in construction and operation.

The motor shown in Figure 2 of the drawings may be started by pressing the start button 20 so as to energize the running solenoid 22 which then closes the main running switch 16. Closing of the running switch 16 causes operation of the motor 10 in the forward direction. Energizing solenoid 22 automatically closes the switch 60 which serves to bridge across the terminals of the start button 20 so as to hold the circuit through the solenoid 22 closed even after the start switch 20 returns to its normally open position. The solenoid 22 also opens the switch 32 so as to maintain the reversing relay 34 deenergized at all times when the running relay 22 is energized.

As explained hereinabove, the pick-up coil 12 has been eliminated and in lieu thereof the leads 61 and 62 are connected as shown so as to pick up the high frequency waves generated in one of the phase windings. The connection to the phase windings is such that the one lead 62 is connected to the neutral line and the lead 61 is connected to either one of the other lines. Thus, this arrangement makes it possible to connect the control relay system to the terminals of a conventional Y-wound polyphase motor without making any internal changes in the motor. The system is applicable to motors having other types of motor windings so long as the connections to the phase windings are such that the high frequency signals do not cancel out.

In Figure 2 of the drawings, I have shown two blocking condensers 46 and 46a connected in series with a switch 42a for shorting the one blocking condenser at all times when the reversing relay 34 is deenergized. Closing of the switch 42a allows the 60 cycle normal wave to be shorted around the one condenser 46a so that there will be enough voltage to pull in the control solenoid 50 during normal operation of the motor 10 in its forward direction. Thus the solenoid 50 holds the switch 56 closed during normal operation of the motor 10, but the reversing solenoid 34 cannot be energized as long as the running solenoid 22 holds the switch 32 open. When it is desired to stop the operation of the motor, the stop button 40 is momentarily pressed so as to deenergize the relay 22, thereby closing the reversing solenoid control switch 32 and opening the power switch 16 and the start button shorting switch 60. Since the control relay 50 pulls in immediately upon the starting of the motor 10 and remains adequately energized during normal rotation of the motor 10, the switch 56 will be in the closed position when the stop button 40 is pressed and will remain closed until the high frequency impulses fed into the rectifier 48 decrease in frequency to a point where the relay 50 will allow opening of the switch 56. Opening of the switch 56 takes place just before the motor comes to a standstill.

It will be noted that when the reversing relay 34 is first energized, the switch 42 is opened, with the result that the combined effect of the condensers 46a and 46 will block out the 60 cycle signal so that only the high frequency signal will be effective in holding the relay 50 closed.

By virtue of the above described arrangement, it is obvious that the control may be added to existing polyphase motors without any alteration or internal changes in the motor. It is also apparent that the control is very simple and inexpensive to manufacture.

One of the advantages of the simplified circuit arrangements shown in Figure 2 over the circuit arrangement shown in Figure 1 is that there is no danger of the motor 10 being operated in reverse due to carelessness on the part of the control operator. Thus, in the circuit arrangement shown in Figure 1 of the drawings, if an operator would press the start button 20 and would immediately thereafter press the stop button 40 before the various control switches would have time to operate, it would be possible to actually cause the motor to be operated in the reverse direction, whereas this would not be possible with the circuit shown in Figure 2 of the drawings.

Another advantage of the circuit arrangement shown in Figure 2 is that the control relay is more certain to operate under abnormal conditions such as when the line voltage is unduly low. In other words, the circuit arrangement shown in Figure 2 is more fool-proof and may even be used in installations where the line voltage may be far below normal.

While I have shown a system in which the high frequency signal generated as a result of the relative rotation between the motor stator and the motor rotor is used for controlling the operation of the motor, it is obvious that this same high frequency signal may be used for controlling other devices which should be started or stopped when the motor stops or may be used for giving a signal for indicating that the motor has stopped operating. Such a signal would be convenient in an installation in which the motor is located at some remote or concealed place.

In the circuit shown in Figure 2, the leads 61 and 62 could be connected to a special pick-up coil such as the coil 12 of Figure 1 and likewise the pick-up coil 12 could be omitted in Figure 1 and the high frequency signal could be picked up from the one phase winding as in Figure 2 of the drawings.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination, a polyphase motor provided with a plurality of phase windings, a source of electrical energy, means for connecting said phase windings to said source including switch mechanism for reversing the polarity of at least two of said phase windings so as to reverse the motor torque for braking purposes, voltage responsive relay means for controlling the operation of said switch mechanism, said relay means including a control relay coil, a rectifier having its direct current terminals connected to supply current to said control relay coil, a pick-up coil disposed within said motor, a resonating condenser connected across said pick-up coil, a blocking condenser, said rectifier having its alternating current terminals connected to said pick-up coil through said blocking condenser, said blocking condenser being constructed so as to block out signals having a frequency corresponding to the frequency of the motor energizing voltage.

2. In combination with a motor having a stator and a rotor, a pick-up coil disposed within said motor to generate signals resulting from relative rotation between said rotor and said stator, and control means operating in response to a predetermined variation in said generated signals for exercising a control function, said control means including a resonant circuit having a resonating condenser connected across said pick-up coil and a blocking condenser connected in series with said pick-up coil for blocking out signals having a frequency corresponding to the frequency of the motor energizing voltage source.

3. In combination with a motor having a stator and a rotor; a power unit comprising a pick-up coil disposed to generate signals resulting from relative rotation between said rotor and said stator, and control means operated in response to a predetermined variation in said generated signals; said power unit including a resonant circuit having a resonating condenser connected across said pick-up coil, a blocking condenser connected in series with said pick-up coil, and a rectifier connected in series with said blocking condenser and said pick-up coil for rectifying the signals passing through said blocking condenser.

4. In combination with a motor having a stator and a rotor; a power unit comprising a pick-up coil disposed to generate signals resulting from relative rotation between said rotor and said stator, and control means operated in response to predetermined variation in said generated signals; said power unit including a resonant circuit having a resonating condenser connected across said pick-up coil, a blocking condenser connected in series with said pick-up coil, a rectifier connected in series with said blocking condenser and said pick-up coil for rectifying the signals passing through said blocking condenser, and a solenoid connected to the output of said rectifier for operating said control means.

5. In combination with a motor having a stator and a rotor; a power unit comprising a pick-up coil disposed to generate signals resulting from relative rotation between said rotor and said stator; said power unit including a resonant circuit having a resonating condenser connected across said pick-up coil, a blocking condenser connected in series with said pick-up coil, a rectifier connected in series with said blocking condenser and said pick-up coil for rectifying the signals passing through said blocking condenser, a solenoid connected to the output of said rectifier, and means operated by said solenoid for controlling the energization of said motor.

6. In combination, a polyphase motor having a stator provided with a plurality of phase windings and having a squirrel cage rotor, a source of polyphase current, means for connecting said phase windings to said source of current including switch mechanism for momentarily reversing the polarity of at least two of said phase windings so as to reverse the motor torque for rotor braking purposes, voltage responsive relay means for controlling the operation of said switch mechanism, said relay means including a control solenoid for controlling the operation of said switch mechanism, a rectifier having its direct current terminals connected to said solenoid, a pick-up coil disposed within said stator in close proximity to said squirrel cage rotor, a resonating condenser connected across said pick-up coil, a blocking condenser, said rectifier having its input terminals connected to said pick-up coil through said blocking condenser, said blocking condenser being constructed so as to block out signals having a frequency corresponding to the frequency of the motor energizing current.

7. In combination, a polyphase motor having a stator provided with a plurality of phase windings and having a squirrel cage rotor, a source of electrical energy, means for connecting said phase windings to said source of electrical energy including switch mechanism for momentarily reversing the polarity of at least two of said phase windings so as to reverse the motor torque for rotor braking purposes, voltage responsive relay means for controlling the operation of said switch mechanism, said relay means including a control solenoid for controlling the operation of said switch mechanism, a rectifier having its direct current terminals connected to said solenoid, a pick-up coil disposed within said stator in close proximity to said squirrel cage rotor, a resonating condenser connected across said pick-up coil, a blocking condenser, said rectifier having its input terminals connected to said pick-up coil through said blocking condenser, said blocking condenser being constructed so as to block out signals having a frequency corresponding to the frequency of the motor energizing voltage, a circuit maker and breaker arranged in series with said pick-up coil, and means automatically operated in response to movement of said switch mechanism into the motor reversing position for closing said circuit maker and breaker.

8. In combination, a polyphase motor having a stator provided with a plurality of phase windings, a source of electric energy, means for connecting said phase windings to said source including switch mechanism for reversing the polarity of at least two of said phase windings so as to reverse the motor torque for braking purposes, voltage responsive relay means for controlling the operation of said switch mechanism, said relay means including a control relay coil, means connected to one of said phase windings for detecting the presence of the high frequency signal generated in said one phase winding of said stator as a result of the relative rotation between the motor rotor and the motor stator, and means responsive to a predetermined change in the frequency of said signal for controlling the energization of said relay coil.

9. In combination with a motor having stator windings and a rotor, a relay system having leads connected across at least a portion of said stator windings, said relay system including means for resonating signals within a given frequency range supplied to said leads from said windings, and blocking means for blocking signals having a frequency corresponding to the frequency of the current supplied to the motor for operating the motor.

10. In combination with a motor having stator windings and a rotor, a relay system connected across at least a portion of said stator windings to be energized from current generated in said windings, said relay system including means for resonating signals within a given frequency range and including blocking means for blocking other signals within a different frequency range, and motor reversing switch means operated by said relay system.

11. In combination a polyphase motor having a stator and a rotor, a motor starting switch, a motor phase reversing switch, a first solenoid for closing said motor starting switch, a second solenoid for closing said reversing switch, a relay system including means responsive to signals generated as a result of relative rotation between said rotor and said stator and including relay means operated in response to a predetermined variation in said signals for deenergizing said reversing switch; said relay system including a resonant circuit having a resonating condenser connected across means for picking up said signals and a plurality of blocking condensers connected in series with said pick-up means, said relay system also including a rectifier connected in series with said blocking condenser and said pick-up means for rectifying the signals passing through said blocking condensers, and means operated by said second solenoid for short circuiting at least one of said blocking condensers.

12. In combination, a polyphase squirrel cage motor provided with a plurality of phase windings and a rotor, a source of polyphase current, motor energizing switch means for connecting said phase windings so as to operate said rotor in a first direction, motor torque reversing switch means for connecting said phase windings to said source for reversing at least two of said phase windings so as to reverse the motor torque for braking purposes, a first solenoid for operating said first named switch, a start button switch biased to the open circuit position and connected in series with said first solenoid, means for short circuiting said start button switch in response to energization of said first solenoid, a second solenoid for controlling said motor torque reversing switch means, means responsive to the generation of a signal of a given frequency range within said phase winding of said motor for controlling said second solenoid, and means operated by said first solenoid for further controlling the operation of said second solenoid so as to prevent closing said reversing switch while said motor energizing switch means is closed.

13. In combination with a motor having a stator and a rotor and including coil means to generate signals resulting from relative rotation between said rotor and said stator, control means operating in response to a predetermined variation in said generated signals for exercising a control function, said control means including a resonant circuit having a resonating condenser connected across said coil means and a blocking condenser connected in series with said coil means for blocking out signals having a frequency corresponding to the frequency of the motor energizing voltage source.

14. In combination with a motor having stator windings and a rotor, a relay system having leads connected across at least a portion of said stator windings, said relay system including means responsive to signals within a given frequency range supplied to said leads from said windings, and blocking means for blocking signals having a frequency corresponding to the frequency of the currents supplied to the motor for operating the motor.

15. Apparatus responsive to a predetermined change in speed of a rotor relative to a stator having windings comprising in combination, first means responsive to a signal generated within said windings and having a frequency indicative of the speed of said rotor, said means including blocking condenser means, and relay means responsive to a predetermined variation in the frequency of the generated signal for exercising a control function.

16. In combination, a polyphase motor having a stator provided with a plurality of phase windings and having a squirrel cage rotor, a source of polyphase current, means for connecting said phase windings to said source of current including switch mechanism for momentarily reversing the polarity of at least two of said phase windings so as to reverse the motor torque for rotor braking purposes, voltage responsive relay means for controlling the operation of said switch mechanism, said relay means including a control solenoid for controlling the operation of said switch mechanism, a rectifier having its direct current terminals connected to said solenoid, a resonating condenser connected across a portion of said phase windings, a blocking condenser, said rectifier having its input terminals connected to said resonating condenser through said blocking condenser, said blocking condenser being constructed so as to block out signals having a frequency corresponding to the frequency of the motor energizing current.

17. In combination with a motor having stator windings and a rotor, a relay system connected across at least a portion of said stator windings to be energized from current generated in said windings, said relay system including means responsive to signals within a given frequency range generated in said stator windings and including blocking means for blocking other signals within a different frequency range.

18. In combination, a motor having a rotor and having stator windings for supplying the main field excitation for operating the motor, said rotor having conductors therein whereby relative rotation between said rotor and said stator windings generates a high frequency ripple voltage in said stator windings, and motor plugging means connected to said stator windings and operable in response to changes in the ripple voltage generated in said stator windings as a result of relative rotation between said conductors and said windings for controlling the plugging of said motor.

SAMUEL NOODLEMAN.

REFERENCES CITED

The following references are of record in the file of this patent:

UNITED STATES PATENTS

| Number | Name | Date |
| --- | --- | --- |
| 1,315,965 | Jennings | Sept. 16, 1919 |
| 1,983,656 | Brown | Dec. 11, 1934 |
| 2,131,607 | Wade | Sept. 27, 1938 |
| 2,132,888 | Werner | Oct. 11, 1938 |
| 2,151,178 | Anderson | Mar. 21, 1939 |
| 2,165,491 | Leitch | July 11, 1939 |
| 2,442,207 | Noodleman | May 25, 1948 |
| 2,442,213 | Ross | May 25, 1948 |